US009223982B2

(12) United States Patent
Adams et al.

(10) Patent No.: US 9,223,982 B2
(45) Date of Patent: Dec. 29, 2015

(54) CONTINUATION OF TRUST FOR PLATFORM BOOT FIRMWARE (71) Applicant: Intel Corporation, Santa Clara, CA (US)

(72) Inventors: Nicholas J. Adams, Beaverton, OR (US); Willard M. Wiseman, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 49 days.

(21) Appl. No.: 13/782,512

(22) Filed: Mar. 1, 2013

(65) Prior Publication Data

US 2014/0250291 A1   Sep. 4, 2014

(51) Int. Cl.
G06F 11/30 (2006.01)
G06F 21/57 (2013.01)

(52) U.S. Cl.
CPC ................... *G06F 21/575* (2013.01)

(58) Field of Classification Search
CPC ................... G06F 21/64; G06F 21/51
USPC .......................... 713/150, 187–189
See application file for complete search history.

(56) References Cited

U.S. PATENT DOCUMENTS

| | | | |
|---|---|---|---|
| 8,365,297 B1 | 1/2013 | Parshin et al. | |
| 2007/0061597 A1* | 3/2007 | Holtzman et al. | 713/193 |
| 2007/0300007 A1* | 12/2007 | Bulusu et al. | 711/103 |
| 2008/0244553 A1* | 10/2008 | Cromer et al. | 717/168 |
| 2009/0327741 A1 | 12/2009 | Zimmer et al. | |
| 2011/0138166 A1 | 6/2011 | Peszek et al. | |
| 2012/0272296 A1 | 10/2012 | Hodzic et al. | |

OTHER PUBLICATIONS

UEFI Platform Initialization Specification Revision 1.2.1, vol. 3: Shared Architectural Elements, Oct. 26, 2012.
Freescale Semiconductor Inc., "Secure Boot on i.MX50, i.MX53, and i.MX 6 Series using HABv4", Document No. AN4581, Oct. 25, 2012, 43 Pages. web page available at: <http://cache.freescale.com/files/32bit/doc/app_note/AN4581.pdf>.
International Search Report and Written Opinion received for PCT Patent Application No. PCT/US2014/019238, mailed on May 20, 2014, 10 Pages.
International Preliminary Report on Patentability received for PCT Application No. PCT/US2014/019238, mailed on Sep. 11, 2015, 7 pages.

* cited by examiner

*Primary Examiner* — Anthony Brown
(74) *Attorney, Agent, or Firm* — Grossman, Tucker, Perreault & Pfleger, PLLC (57) ABSTRACT

This disclosure is directed to continuation of trust for platform boot firmware. A device may comprise a processing module and a memory module including read-only memory (ROM) on which is stored platform boot firmware. On activation, the processing module may load the platform boot firmware. The platform boot firmware may cause the processing module to first load a trusted pre-verifier file to load and verify the signature of a hash table loaded from the platform boot firmware. The processing module may then load firmware program files from the platform boot firmware, calculate a hash for each file, and verify whether each program hash is in the hash table. Firmware program files with hashes in the hash table may be allowed to execute. If any firmware program file hash is not in the hash table, the processing module may perform platform specific security actions to prevent the device from being compromised.

18 Claims, 4 Drawing Sheets

FIG. 4

CONTINUATION OF TRUST FOR PLATFORM BOOT FIRMWARE

TECHNICAL FIELD

The present disclosure relates to device activation activities, and more particularly, to a system for expediting device activation while providing security against viruses and/or malware.

BACKGROUND

Security continues to be a concern as people are increasingly conducting personal and/or confidential transactions electronically. In addition, hackers and/or others with malicious intent are becoming increasingly more creative in circumventing existing security measures in devices. To combat new and pervasive incursions by malware and/or viruses, equipment and/or software manufacturers are continuing to make protection measures more intrinsic to the hardware of new devices. For example, large companies including Apple Inc., Microsoft, Inc., etc. are beginning to require that equipment executing their software provide a hardware root of trust. A hardware root of trust may comprise, for example, known valid (e.g., inherently trusted) program files that are used for validating subsequently loaded program files. A hardware root of trust may be, for example, established at device activation based on at least one program file loaded from a read-only memory (ROM) on which platform boot firmware may reside in the device. Any malware, viruses, etc. loaded subsequent to the hardware root of trust may be identified by the hardware root of trust, disabled and/or otherwise prevented from compromising a device.

Existing strategies for establishing a hardware root of trust include loading and executing at least one program file from the ROM in which the platform boot firmware is stored to verify a signature of a subsequently loaded program file. In verifying the file's signature, the previously executed file may authenticate that the subsequently loaded file has been provided from a trusted source based on, for example, a keying algorithm such as RSA, etc. Each program file loaded, verified and executed from the platform boot firmware ROM may then verify the signature of the subsequently loaded program file, and so on until all program files are loaded from the platform boot firmware. While implementing this signing-based chain methodology may ensure that all of the files loaded during device activation are signed, and thus valid, there are some drawbacks. Signing increases file size, and likewise, the amount of memory resources used when each file is loaded. Signature verification requires a substantial amount of time for each file that is verified. Both of these requirements increase substantially when signing is conducted serially for all files to be loaded from the platform boot firmware. These memory and time requirements can delay device startup, negatively impact user experience, add to the cost of the device, etc.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

This disclosure is directed to continuation of trust for platform boot firmware. In general, a device may comprise a processing module and a memory module including, for example, read-only memory (ROM) on which is stored platform boot firmware. When the device is activated, the processing module may load the platform boot firmware. The platform boot firmware may, for example, cause the processing module to first load a trusted program file (e.g., a pre-verifier) that may be configured to load and verify the signature of a hash table loaded from the platform boot firmware. The processing module may then proceed to load other files from the platform boot firmware, to calculate a hash for each file, and to verify whether the hash corresponding to each program file is in the hash table. Program files with hashes in the hash table may be allowed to execute. If any hash corresponding to a loaded program file is not in the hash table, the processing module may perform platform specific security actions to prevent the device from being compromised.

In one embodiment, a device may comprise a memory module and a processing module. The memory module may include at least platform boot firmware. The processing module may be to load the platform boot firmware when the device is activated. The platform boot firmware may then cause the processing module to, for example, load a hash table, to calculate hashes for platform boot firmware files loaded subsequent to the hash table and to determine whether the calculated platform boot firmware file hashes are in the hash table.

The memory module in the device may include read-only memory to store the platform boot firmware. The read-only memory may store platform boot firmware based on, for example, a Basic Input/Output System (BIOS), a Unified Extensible Firmware Interface (UEFI), a coreboot (e.g., Linux-based) system, etc. In at least one example implementation, loading of the platform boot firmware may further comprise causing the processing module to load a pre-verifier file. The pre-verifier file may then verify a signature of the hash table prior to determining whether the calculated platform boot firmware file hashes are in the hash table. In one embodiment, the pre-verifier may be only to verify the signature of the hash table and not to verify the signature of any of the platform boot firmware files.

In the same or a different embodiment, loading of the platform boot firmware files may further comprise causing the processing module to execute platform boot firmware files that are determined to have hashes in the hash table. A determination that any platform boot firmware files have hashes that are not in the hash table may cause the processing module to perform a security action (e.g., to protect the integrity of the device). An example method consistent with at least one embodiment of the present disclosure may include loading a hash table and platform boot firmware files after a device is activated, calculating hashes for each of the platform boot firmware files, and determining whether each of the calculated platform boot firmware files hashes are in the hash table.

Figure 1:
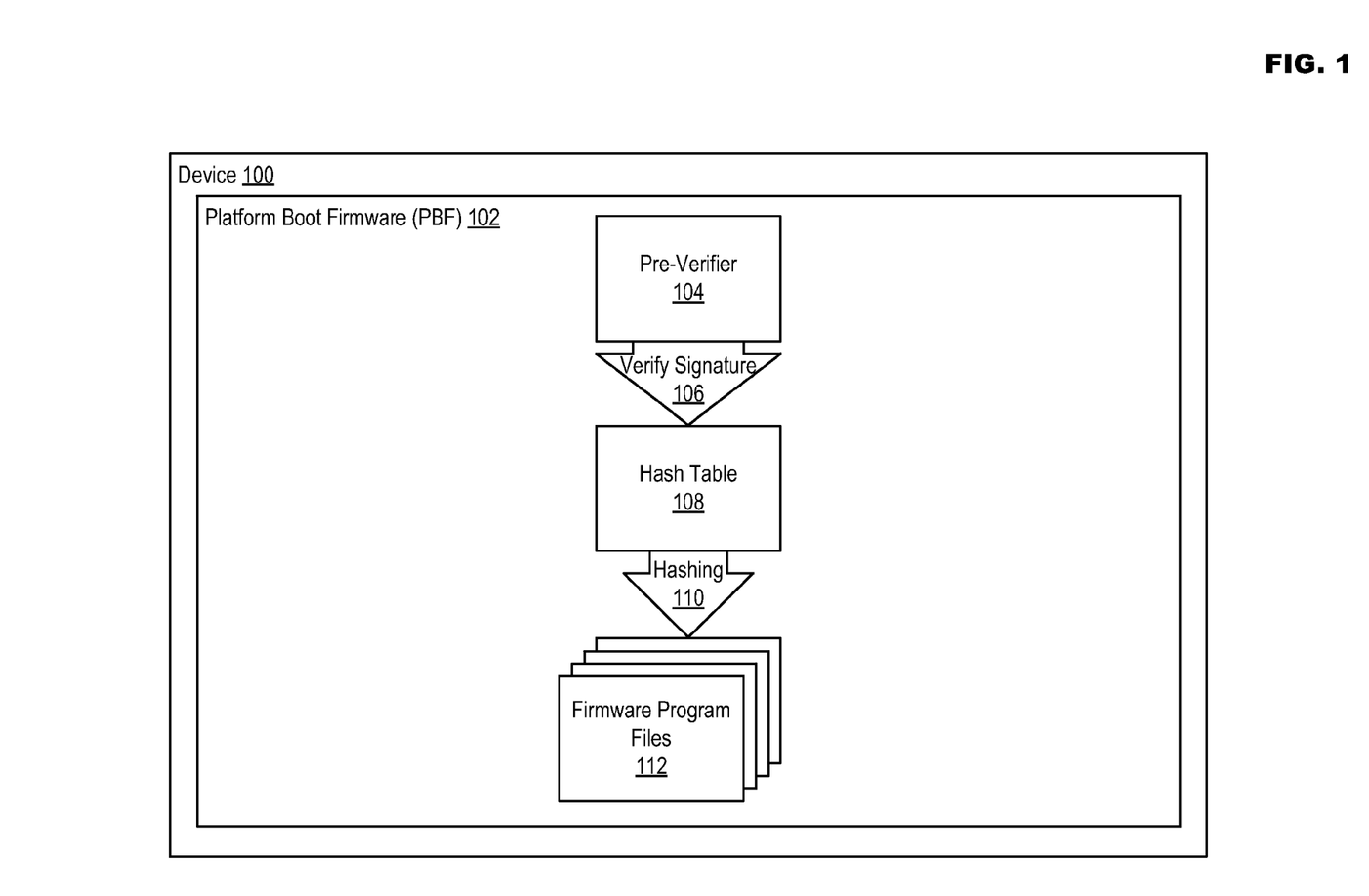
FIG. 1 illustrates an example device configured for continuation of trust for platform boot firmware in accordance with at least one embodiment of the present disclosure.

FIG. 1 illustrates example device 100 configured for continuation of trust for platform boot firmware in accordance with at least one embodiment of the present disclosure. Examples of device 100 may include, but are not limited to, mobile communication devices such as cellular handsets or smartphones based on the Android® operating system (OS), iOS®, Windows® OS, Blackberry® OS, Palm® OS, Symbian® OS, etc., mobile computing devices such as tablet computers like an iPad®, Galaxy Tab®, Surface®, Kindle Fire®, etc., Ultrabooks® including a low-power chipset manufactured by Intel Corporation, netbooks, notebooks, laptops, palmtops, etc., and typically stationary computing devices such as a desktops, servers, set-top boxes, etc.

In one embodiment, device 100 may comprise platform boot firmware (PBF) 102. PBF 102 may include, for example, pre-verifier 104, hash table 108 and firmware program files 112 (e.g., platform boot program files). In one example of operation, the above program files 104, 108 and 112 within PBF 102 may be loaded into device 100 during device activation (e.g., as part of device boot operations). In one embodiment, at least some of firmware program files 112 may act as a hardware root of trust in device 100 in that they may operate to authenticate other program files loaded during the normal operation of device 100.

The authentication services provided by the hardware root of trust may help to ensure that later loaded program files are not, or do not include, malicious and/or malevolent software (e.g., malware) such as adware, spyware, worms, Trojan horses, backdoors and/or other program code that may be capable of overriding security measures in device 100, taking control of device 100, stealing information from device 100, deleting information from device 100, etc. However, one manner in which such safeguards may be circumvented by attacking the hardware root of trust. For example, if one or more of the files operating in the hardware root of trust is compromised, then all file verification and/or authentication performed by the hardware root of trust may also be compromised, making it possible for malware to infiltrate and/or corrupt device 100.

In view of this potential security issue, some device manufacturers are now requiring that the hardware root of trust be authenticated during the boot process of device 100. An example of fulfilling this requirement would be to launch a first known good file (e.g., pre-verifier 104) that may verify signatures associated with the next loaded files (e.g., one of firmware program files 112). Signature verification, as referenced herein, may include authenticating the origin and/or version of the file based on a signature associated with the file using an encryption scheme (e.g., RSA public-key encryption). The newly verified firmware program file 112 may then verify the signature of the next loaded firmware program file 112, and so on in a chain until all of the firmware program files have been loaded. While this solution may be effective from a security standpoint, it is also inefficient from a time and resource standpoint. Initially, the time for device 100 to serially verify each firmware program file 112 constitutes a long enough duration that the overall performance of device 100 during boot may be negatively impacted. Moreover, the additional data needed to support signing may substantially increase the size of firmware program files 112, which may consume precious space in what may be a limited-sized read-only memory (ROM) in device 100.

In embodiments consistent with the present disclosure, ensuring the security of firmware program files 112 loaded from PBF 102 by serially verifying each file signature is replaced by a hash-based verification system. A hash, as referred to herein, may be a cryptographic string value determined based on the contents of a program file. An important characteristic of hashes is that there is a very high probability that the value of a cryptographic hash determined for a particular file will change based on any changes to the content of the file. As a result, hashes determined based on known good versions of firmware program files 112 may be relied upon as strong indicators as to whether the content of a firmware program file 112 is identical to the known good version. Moreover, hashes are relatively fast to determine, at least when compared to the verification of file signatures, and hash determination does not require any specific security-related data (e.g., origin data, version data, security keys, etc.) since it is based simply on the content of the file. In view of the above, hashes may be a valuable tool for use in identifying firmware program files 112 that have been tampered with or replaced.

In the example implementation illustrated in FIG. 1, known good pre-verifier 104 may be loaded first, and may then verify the signature of hash table 108 as shown at 106 in accordance with known methods for authenticating file origin (e.g., RSA encryption). Hash table 108 may, for example, include hash values for known good versions of firmware program files 112. Hashes may be determined for each firmware program file 112 loaded by device 100, and the hashes may then be compared to hashes stored in hash table 108 as shown at 110. If a hash corresponding to a particular firmware program file 112 is determined to be in hash table 108, then the firmware program file 112 may be considered good and is allowed to execute. If any hash corresponding to a firmware program file 112 is not located in hash table 108, then a problem may exist requiring security action to be taken. The security action may be platform-specific, and may, for example, halt execution of the firmware program file 112 corresponding to the hash that was not located in hash table 108, may halt activation of device 100 and/or may issue a notification that a security problem may exist in device 100. In this manner, the various embodiments consistent with the present disclosure may substantially reduce the amount of time and memory resources required for activating device 100 while still ensuring that the integrity of the hardware root of trust is maintained in device 100.

Figure 2:
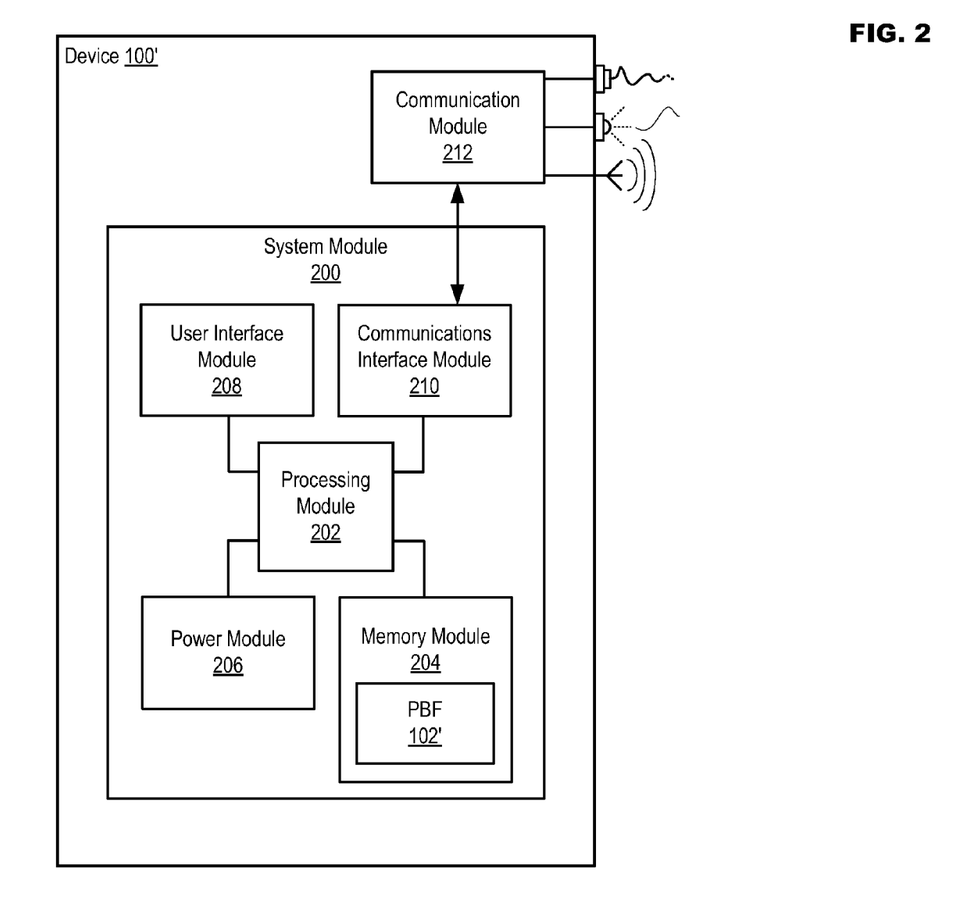
FIG. 2 illustrates an example configuration for a device usable in accordance with at least one embodiment of the present disclosure.

FIG. 2 illustrates an example configuration for device 100' usable in accordance with at least one embodiment of the present disclosure. Device 100' is an example of equipment usable to perform operations such as shown in FIG. 1. While embodiments consistent with the present disclosure may employ device 100', these embodiments are not limited only to devices with the disclosed configuration. Example device 100' may comprise system module 200 configured to manage device operations. System module 200 may include, for example, processing module 202, memory module 204 (e.g., including PBF 102'), power module 206, user interface module 208 and communications interface module 210 for interacting with communication module 212. While communication module 212 has been illustrated as separate from system module 200, this location is merely for the sake of explanation herein. Some or all of the functionality associated with communication module 212 may also be incorporated within system module 200.

In device 100', processing module 202 may comprise one or more processors situated in separate components, or alternatively, may comprise one or more processing cores embodied in a single component (e.g., in a System-on-a-Chip (SOC) configuration) and any processor-related support circuitry (e.g., bridging interfaces, etc.). Example processors may include various x86-based microprocessors available from the Intel Corporation including those in the Pentium, Xeon, Itanium, Celeron, Atom, Core i-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 202 may interact with other system components that may be operating at different speeds, on different buses, etc. in device 100'. Some or all of the functionality commonly associated with the support circuitry may also be included in the same physical package as the processor (e.g., an SOC package like the Sandy Bridge integrated circuit available from the Intel Corporation).

Processing module 202 may be configured to execute various instructions in device 100'. Instructions may include program code configured to cause processing module 202 to perform activities related to reading data, writing data, processing data, formulating data, converting data, transforming data, etc. Information (e.g., instructions, data, etc.) may be stored in memory module 204. Memory module 206 may comprise random access memory (RAM) or read-only memory (ROM) in a fixed or removable format. RAM may include memory configured to hold information during the operation of device 100' such as, for example, static RAM (SRAM) or Dynamic RAM (DRAM). ROM may include memories configured as BIOS, UEFI, etc. for providing startup instructions when device 100' activates, programmable memories such as electronic programmable ROMs (EPROMS), Flash, etc. Other fixed and/or removable memory may include magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), etc. Power module 206 may include internal power sources (e.g., a battery) and/or external power sources (e.g., electromechanical or solar generator, power grid, fuel cells, etc.), and related circuitry configured to supply device 100' with the power needed to operate.

User interface module 208 may comprise componentry configured to allow users to interact with device 100' such as, for example, various input mechanisms (e.g., microphones, switches, buttons, knobs, keyboards, speakers, touch-sensitive surfaces, one or more sensors configured to capture images and/or sense proximity, distance, motion, gestures, etc.) and various output mechanisms (e.g., speakers, displays, lighted/flashing indicators, electromechanical components for vibration, motion, etc.). Communication interface module 210 may include communication processor 114, and may be configured to handle packet routing and other control functions for communication module 214, which may include resources configured to support wired and/or wireless communications. Wired communications may include serial and parallel wired mediums such as, for example, Ethernet, Universal Serial Bus (USB), Firewire, Digital Visual Interface (DVI), High-Definition Multimedia Interface (HDMI), etc. Wireless communications may include, for example, close-proximity wireless mediums (e.g., radio frequency (RF) such as based on the Near Field Communications (NFC) standard, infrared (IR), optical character recognition (OCR), magnetic character sensing, etc.), short-range wireless mediums (e.g., Bluetooth, WLAN, Wi-Fi, etc.) and long range wireless mediums (e.g., cellular, satellite, etc.). In one embodiment, communication interface module 212 may be configured to prevent wireless communications that are active in communication module 214 from interfering with each other. In performing this function, communication interface module 212 may schedule activities for communication module 214 based on, for example, the relative priority of messages awaiting transmission.

In an example of operation, upon activation of device 100' processing module 202 may access memory module 204 to load PBF 102' (e.g., from a ROM formatted using BIOS, UEFI, coreboot, etc.). PBF 102' may cause processing module 202 to load pre-verifier 104 followed by hash table 108. Pre-verifier 104 may first verify the signature of hash table 108 to establish the authenticity of hash table 108. PBF 102' may then instruct processing module 102 to load firmware program files 112, to determine a hash for each loaded firmware program file 112, and to determine whether the hashes for each of the loaded firmware program files 112 is stored in hash table 108. Each program files whose hash is located in hash table 108 may then be allowed to execute (e.g., may then be executed by processing module 202). If any of the hashes corresponding to firmware program files 112 is determined not to be in the hash table, then processing module 202 may perform a security action to prevent device 100' from being compromised (e.g., due to malware). Example security actions may include halting the execution of a particular firmware program file 112, halting boot of device 102' and/or presenting a notification in regarding to a security problem with PBF 102'.

Figure 3:
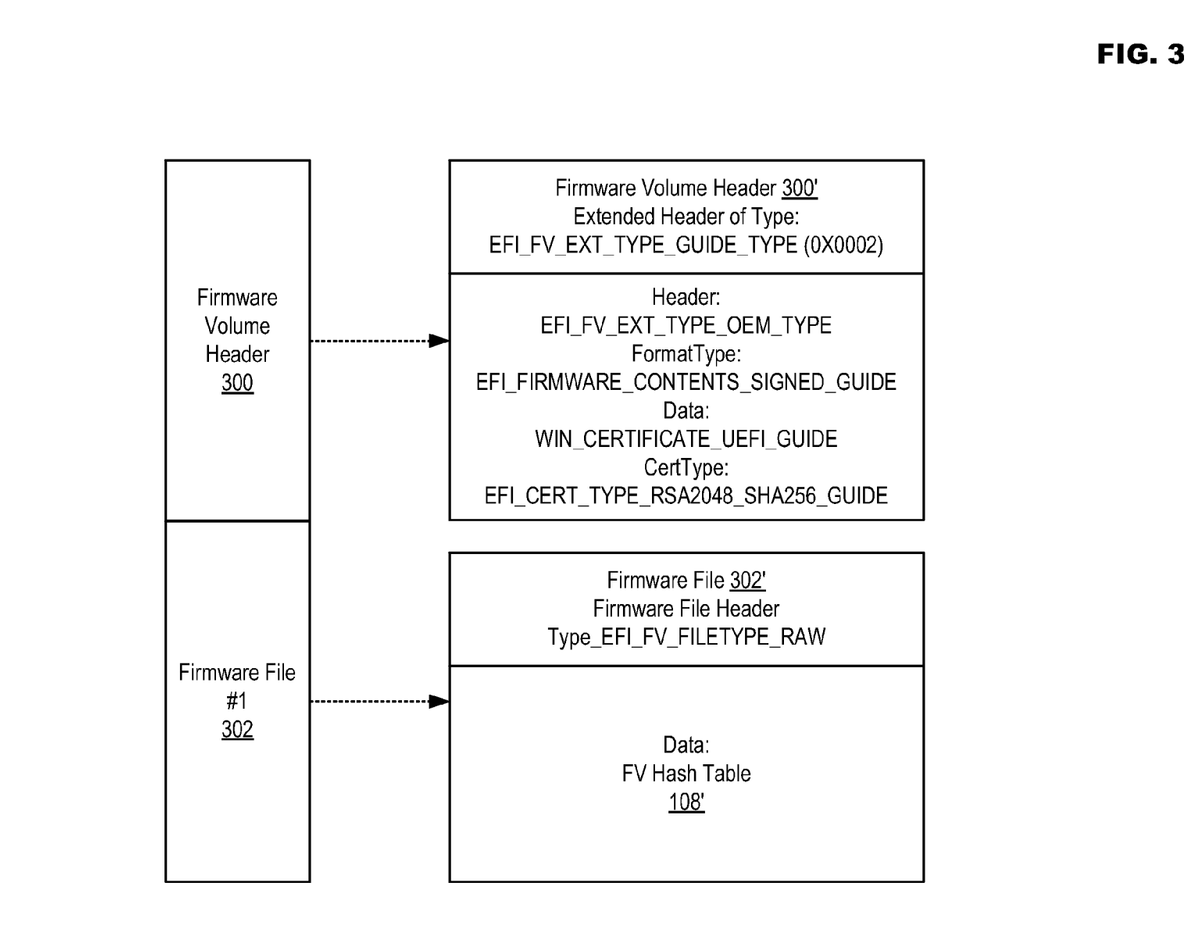
FIG. 3 illustrates example program structures in accordance with at least one embodiment of the present disclosure.

FIG. 3 illustrates example program structures in accordance with at least one embodiment of the present disclosure. Initially, the manner in which files are loaded from PBF 102 in device 100 may be dictated by the configuration of device 100 (e.g., memory type, boot system format, operating system, etc.). For example, in an instance where UEFI is being employed, files may be retrieved from PBF 102 in accordance with UEFI Platform Initialization Specification Revision 1.2.1, Volume 3. In an example of operation, firmware volume (FV) header 300, hereafter "file 300," may be loaded first followed by loading firmware file #1 302, hereafter "file 302". In an example of an actual use case based on UEFI, files 300 and 301 may be part of a Pre-Extensible Firmware Interface (PEI) stage of platform initialization. Files 300 and 302 may be employed in, for example, determining whether to launch files in a Driver Execution Environment (DXE) based on verifying that the files to be loaded into the DXE (e.g., firmware program files 112) have hashes corresponding to known good versions. In one embodiment, the signature of file 302 may be verified by pre-verifier 104 (e.g., using RSA encryption) to check its authenticity prior to checking the hashes of subsequently loaded files. The public key used to verify the signature of file 302 may, for example, reside in the PEI for safekeeping. However, a public key from a boot manifest in device 100 may also be used in signing file 302 as it may be considered equivalent to the PEI public key from a security perspective while conserving memory space in the boot memory (e.g., ROM).

Consistent with various embodiments of the present disclosure, file 300 may include an extended header type EFI_FV_EXT_TYPE_GUIDE_TYPE (0X0002) identifying the file (e.g., and its various contents). File 300 may also comprise information including, for example, a header EFI_FV_EXT_TYPE_OEM_TYPE identifying the file in PBD 102, an example format type of EFI_FIRMWARE_CONTENTS_SIGNED_GUIDE identifying the format of file 300, example data comprising WIN_CERTIFICATE_UEFI_GUIDE and an example certificate type of EFI_CERT_TYPE_RSA2048_SHA256_GUIDE for use in authenticating file 300. File 302 may comprise, for example, information including a header Type_EFI_FV_FILETYPE_RAW identifying the content of the file as FV Hash table 108'. FV hash table 108' may comprise, for example, a standardized structure for storing hash values corresponding to known good versions firmware program files 112 (e.g., along with any information that may be needed to identify and interpret its contents). For example, FV hash table 108' may include a global unique identifier (GUID), version information for the hash table structure, an indication of the number of hashes stored in the table, etc. Moreover, each hash stored in the table may include corresponding information such as the firmware data type (e.g., identification of the known good code that was the source of the hash including firmware volume, firmware file, firmware file section, etc.), the hash type such as secure hash algorithm 256 (SHA-256), SHA-1, etc., along with the hash value.

Figure 4:
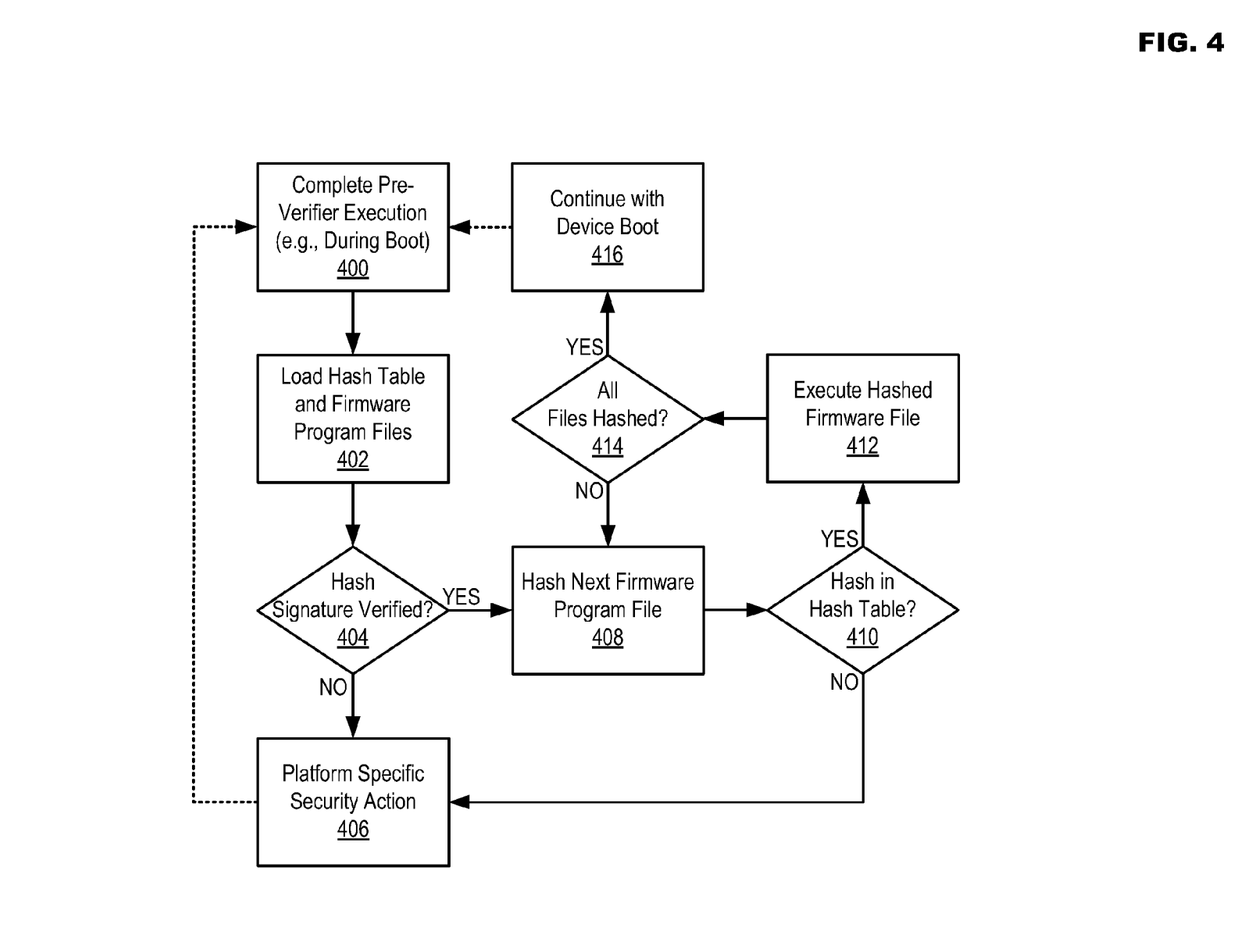
FIG. 4 illustrates example operations for continuation of trust for platform boot firmware in accordance with at least one embodiment of the present disclosure.

FIG. 4 illustrates example operations for continuation of trust for platform boot firmware in accordance with at least one embodiment of the present disclosure. In operation 400, pre-verifier execution may be completed in a device during, for example, the activation of the device (e.g., device boot). In operation 402 a hash table and firmware program files may also be loaded into the device. A determination may then be made in operation 404 as to whether the signature of the hash table can be verified (e.g., if the hash table can be authenticated). If it is determined in operation 404 that the hash table cannot be verified, then in operation 406 a platform specific security action may be performed. For example, the device may cease the boot process and/or generate a notification indicating that a possible security issue may exist in the device (e.g. by emitting a tone from a speaker in the device, by displaying a message on a device display, etc.).

If in operation 404 it is determined that the hash table is signed, then in operation 408 the next firmware program file may be hashed (e.g., a hash may be generated based on the contents of a program firmware file whose integrity has not yet been verified). A determination may then be made in operation 410 as to whether a corresponding hash can be located in the hash table. If it is determined in operation 410 that no corresponding hash can be found in the hash table, then in operation 406 a platform specific security action may be performed. Further to the example actions described above, the device could also skip execution of the firmware program file if it is determined that skipping execution would not disrupt device activation. If in operation 410 it is determined that there is a corresponding hash in the hash table (e.g., that the firmware program file is a known good version), then in operation 412 the file corresponding to the hash may be executed. In operation 414, a further determination may be made as to whether all firmware program files have been hashed. A determination that not all firmware program files have been hashed in operation 414 may be followed by a return to operation 408 to hash the next firmware program file. Otherwise, if it is determined in operation 414 that all files have been hashed, then in operation 416 the device may continue with boot. Optionally, operation 416 may be followed by a return to operation 400 to, for example, prepare for the next time the device is activated.

While FIG. 4 illustrates various operations according to an embodiment, it is to be understood that not all of the operations depicted in FIG. 4 are necessary for other embodiments. Indeed, it is fully contemplated herein that in other embodiments of the present disclosure, the operations depicted in FIG. 4, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, this disclosure is directed to continuation of trust for platform boot firmware. A device may comprise a processing module and a memory module including read-only memory (ROM) on which is stored platform boot firmware. On activation, the processing module may load the platform boot firmware. The platform boot firmware may cause the processing module to first load a trusted pre-verifier file to load and verify the signature of a hash table loaded from the platform boot firmware. The processing module may then load firmware program files from the platform boot firmware, calculate a hash for each file, and verify whether each program hash is in the hash table. Firmware program files with hashes in the hash table may be allowed to execute. If any firmware program file hash is not in the hash table, the processing module may perform platform specific security actions to prevent the device from being compromised.

The following examples pertain to further embodiments. In one example there is provided a device. The device may include a memory module including at least platform boot firmware, and a processing module to load the platform boot firmware when the device is activated, the platform boot firmware causing the processing module to load a hash table, to calculate hashes for platform boot firmware files loaded subsequent to the hash table and to determine whether the calculated platform boot firmware file hashes are in the hash table.

The above example device may be further configured, wherein the memory module includes read-only memory to store the platform boot firmware. In this configuration the example device may be further configured, wherein the read-only memory stores platform boot firmware based on a Basic Input/Output System (BIOS), a Unified Extensible Firmware Interface (UEFI) or a coreboot system.

The above example device may be further configured, alone or in combination with the above further configurations, wherein the loading of the platform boot firmware further comprises causing the processing module to load a pre-verifier file to verify a signature of the hash table prior to determining whether the calculated platform boot firmware file hashes are in the hash table. In this configuration the example device may be further configured, wherein the pre-verifier file is not to verify signatures for any of the platform boot firmware files.

The above example device may be further configured, alone or in combination with the above further configurations, wherein the loading of the platform boot firmware further comprises causing the processing module to execute platform boot firmware files that are determined to have hashes in the hash table.

The above example device may be further configured, alone or in combination with the above further configurations, wherein the boot process further comprises causing the processing module to perform a security action if any of the platform boot firmware file hashes are determined not to be in the hash table.

In another example there is provided a method. The method may include loading a hash table and platform boot firmware files when a device is activated, calculating hashes for each of the platform boot firmware files, and determining whether each of the calculated platform boot firmware file hashes are in the hash table.

The above example method may be further configured, wherein the hash table and platform boot firmware files are loaded from a memory module in the device, the memory module including read-only memory. In this configuration the example method may be further configured, wherein the read-only memory stores platform boot firmware based on a Basic Input/Output System (BIOS), a Unified Extensible Firmware Interface (UEFI) or a coreboot system.

The above example method may further comprise, alone or in combination with the above further configurations, loading a pre-verifier file, and verifying a signature of the hash table with the pre-verifier file prior to determining whether the calculated platform boot firmware file hashes are in the hash table. In this configuration the example method may be further configured, wherein signatures are not verified for the platform boot firmware files with the pre-verifier file.

The above example method may further comprise, alone or in combination with the above further configurations, executing platform boot firmware files that are determined to have hashes in the hash table.

The above example method may further comprise, alone or in combination with the above further configurations, performing a security action if any of the platform boot firmware file hashes are determined not to be in the hash table.

In another example there is provided a system comprising at least device, the system being arranged to perform any of the above example methods.

In another example there is provided a chipset arranged to perform any of the above example methods.

In another example there is provided at least one machine readable medium comprising a plurality of instructions that, in response to be being executed on a computing device, cause the computing device to carry out any of the above example methods.

In another example there is provided a device configured with continuation of trust for platform boot firmware arranged to perform any of the above example methods.

In another example there is provided a device having means to perform any of the above example methods.

In another example there is provided a device. The device may include a memory module including at least platform boot firmware, and a processing module to load the platform boot firmware when the device is activated, the platform boot firmware causing the processing module to load a hash table, to calculate hashes for platform boot firmware files loaded subsequent to the hash table and to determine whether the calculated platform boot firmware file hashes are in the hash table.

The above example device may be further configured, wherein the memory module includes read-only memory to store the platform boot firmware. In this configuration the example device may be further configured, wherein the read-only memory stores platform boot firmware based on a Basic Input/Output System (BIOS), a Unified Extensible Firmware Interface (UEFI) or a coreboot system.

The above example device may be further configured, alone or in combination with the above further configurations, wherein the loading of the platform boot firmware further comprises causing the processing module to load a pre-verifier file to verify a signature of the hash table prior to determining whether the calculated platform boot firmware file hashes are in the hash table.

The above example device may be further configured, alone or in combination with the above further configurations, wherein the loading of the platform boot firmware further comprises causing the processing module to execute platform boot firmware files that are determined to have hashes in the hash table.

The above example device may be further configured, alone or in combination with the above further configurations, wherein the boot process further comprises causing the processing module to perform a security action if any of the platform boot firmware file hashes are determined not to be in the hash table.

In another example there is provided a method. The method may include loading a hash table and platform boot firmware files when a device is activated, calculating hashes for each of the platform boot firmware files, and determining whether each of the calculated platform boot firmware file hashes are in the hash table.

The above example method may be further configured, wherein the hash table and platform boot firmware files are loaded from a memory module in the device, the memory module including read-only memory. In this configuration the example method may be further configured, wherein the read-only memory stores platform boot firmware based on a Basic Input/Output System (BIOS), a Unified Extensible Firmware Interface (UEFI) or a coreboot system.

The above example method may further comprise, alone or in combination with the above further configurations, loading a pre-verifier file, and verifying a signature of the hash table with the pre-verifier file prior to determining whether the calculated platform boot firmware file hashes are in the hash table.

The above example method may further comprise, alone or in combination with the above further configurations, executing platform boot firmware files that are determined to have hashes in the hash table.

The above example method may further comprise, alone or in combination with the above further configurations, performing a security action if any of the platform boot firmware file hashes are determined not to be in the hash table.

In another example there is provided a system comprising at least device, the system being arranged to perform any of the above example methods.

In another example there is provided a chipset arranged to perform any of the above example methods.

In another example there is provided at least one machine readable medium comprising a plurality of instructions that, in response to be being executed on a computing device, cause the computing device to carry out any of the above example methods.

In another example there is provided a device. The device may include a memory module including at least platform boot firmware, and a processing module to load the platform boot firmware when the device is activated, the platform boot firmware causing the processing module to load a hash table, to calculate hashes for platform boot firmware files loaded subsequent to the hash table and to determine whether the calculated platform boot firmware file hashes are in the hash table.

The above example device may be further configured, wherein the memory module includes read-only memory to store the platform boot firmware. In this configuration the example device may be further configured, wherein the read-only memory stores platform boot firmware based on a Basic Input/Output System (BIOS), a Unified Extensible Firmware Interface (UEFI) or a coreboot system.

The above example device may be further configured, alone or in combination with the above further configurations, wherein the loading of the platform boot firmware further comprises causing the processing module to load a pre-verifier file to verify a signature of the hash table prior to determining whether the calculated platform boot firmware file hashes are in the hash table. In this configuration the example device may be further configured, wherein the pre-verifier file is not to verify signatures for any of the platform boot firmware files.

The above example device may be further configured, alone or in combination with the above further configurations, wherein the loading of the platform boot firmware further comprises causing the processing module to execute platform boot firmware files that are determined to have hashes in the hash table.

The above example device may be further configured, alone or in combination with the above further configurations, wherein the boot process further comprises causing the processing module to perform a security action if any of the platform boot firmware file hashes are determined not to be in the hash table.

In another example there is provided a method. The method may include loading a hash table and platform boot firmware files when a device is activated, calculating hashes for each of the platform boot firmware files, and determining whether each of the calculated platform boot firmware file hashes are in the hash table.

The above example method may be further configured, wherein the hash table and platform boot firmware files are loaded from a memory module in the device, the memory module including read-only memory. In this configuration the example method may be further configured, wherein the read-only memory stores platform boot firmware based on a Basic Input/Output System (BIOS), a Unified Extensible Firmware Interface (UEFI) or a coreboot system.

The above example method may further comprise, alone or in combination with the above further configurations, loading a pre-verifier file, and verifying a signature of the hash table with the pre-verifier file prior to determining whether the calculated platform boot firmware file hashes are in the hash table. In this configuration the example method may be further configured, wherein signatures are not verified for the platform boot firmware files with the pre-verifier file.

The above example method may further comprise, alone or in combination with the above further configurations, executing platform boot firmware files that are determined to have hashes in the hash table.

The above example method may further comprise, alone or in combination with the above further configurations, performing a security action if any of the platform boot firmware file hashes are determined not to be in the hash table.

In another embodiment there is provided a system. The system may include means for loading a hash table and platform boot firmware files when a device is activated, means for calculating hashes for each of the platform boot firmware files, and means for determining whether each of the calculated platform boot firmware file hashes are in the hash table.

The above example system may be further configured, wherein the hash table and platform boot firmware files are loaded from a memory module in the device, the memory module including read-only memory. In this configuration the example system may be further configured, wherein the read-only memory stores platform boot firmware based on a Basic Input/Output System (BIOS), a Unified Extensible Firmware Interface (UEFI) or a coreboot system.

The above example system may further comprise, alone or in combination with the above further configurations, means for loading a pre-verifier file, and means for verifying a signature of the hash table with the pre-verifier file prior to determining whether the calculated platform boot firmware file hashes are in the hash table. In this configuration the example system may be further configured, wherein signatures are not verified for the platform boot firmware files with the pre-verifier file.

The above example system may further comprise, alone or in combination with the above further configurations, means for executing platform boot firmware files that are determined to have hashes in the hash table.

The above example system may further comprise, alone or in combination with the above further configurations, means for performing a security action if any of the platform boot firmware file hashes are determined not to be in the hash table.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device, comprising:
  a memory module including at least platform boot firmware including a plurality of platform boot firmware files; and a processing module including a processor configured to load the platform boot firmware when the device is activated, the platform boot firmware causing the processing module to load a hash table, wherein the processing module calculates a hash value for a first platform boot firmware file of the plurality of platform boot firmware files and, upon determining the hash value is in the hash table, proceeding to execute the first platform boot firmware file prior to calculating a subsequent hash value for a subsequent platform boot firmware file of the plurality of platform boot firmware files and, responsive to determining at least one hash value is not in the hash table, denying execution of the respective platform boot firmware file on the processor.

2. The device of claim 1, wherein the memory module includes read-only memory to store the platform boot firmware.

3. The device of claim 2, wherein the read-only memory stores platform boot firmware based on a Basic Input/Output System (BIOS), a Unified Extensible Firmware Interface (UEFI) or a coreboot system.

4. The device of claim 1, wherein the loading of the platform boot firmware further comprises causing the processing module to load a pre-verifier file to verify a signature of the hash table prior to determining whether the first platform boot firmware file hash is in the hash table.

5. The device of claim 4, wherein the pre-verifier file is not to verify signatures for any of the plurality of platform boot firmware files.

6. The device of claim 1, wherein the boot process further comprises causing the processing module to perform at least one of halting the boot of the device and presenting a notification at least one of the plurality of platform boot firmware files hash values are determined not to be in the hash table.

7. A method, comprising:
loading a hash table and platform boot firmware files when a device is activated using a processor;
calculating a hash value for a first platform boot firmware file;
determining whether the hash value for the first platform boot firmware file in the hash table; and
responsive to the hash value for the first platform boot firmware file being in the hash table, executing the first platform boot firmware file on the processor prior to calculating a subsequent hash value for a subsequent platform boot firmware file.

8. The method of claim 7, wherein the hash table and platform boot firmware files are loaded from a memory module in the device, the memory module including read-only memory.

9. The method of claim 8, wherein the read-only memory stores platform boot firmware based on a Basic Input/Output System (BIOS), a Unified Extensible Firmware Interface (UEFI) or a coreboot system.

10. The method of claim 7, further comprising:
loading a pre-verifier file; and
verifying a signature of the hash table with the pre-verifier file prior to determining whether the calculated hash value for the first platform boot firmware file is in the hash table.

11. The method of claim 10, wherein signatures are not verified for the platform boot firmware files with the pre-verifier file.

12. The method of claim 7, further comprising performing a security action if at least one of the platform boot firmware file hash values are determined not to be in the hash table.

13. One or more non-transitory machine-readable storage memories having stored thereon, individually or in combination, instructions that when executed by one or more processors result in the following operations comprising:
loading a hash table and platform boot firmware files when a device is activated using at least one processor;
calculating a hash value for a first platform boot firmware file;
determining whether the hash value for the first platform boot firmware file is in the hash table; and
responsive to the hash value for the first platform boot firmware file being in the hash table, executing the first platform boot firmware file on the processor prior to calculating a subsequent hash value for a subsequent platform boot firmware file.

14. The one or more non-transitory memories of claim 13, wherein the hash table and platform boot firmware files are loaded from a memory module in the device, the memory module including read-only memory.

15. The one or more non-transitory memories of claim 14, wherein the read-only memory stores platform boot firmware based on a Basic Input/Output System (BIOS), a Unified Extensible Firmware Interface (UEFI) or a coreboot system.

16. The one or more non-transitory memories of claim 13, further comprising instructions that when executed by one or more processors result in the following operations comprising:
loading a pre-verifier file; and
verifying a signature of the hash table with the pre-verifier file prior to determining whether the calculated hash value for the first platform boot firmware file is in the hash table.

17. The one or more non-transitory memories of claim 16, wherein signatures are not verified for the platform boot firmware files with the pre-verifier file.

18. The one or more non-transitory memories of claim 13, further comprising instructions that when executed by one or more processors result in the following operations comprising:
performing a security action if at least one of the platform boot firmware file hash values are determined not to be in the hash table.

* * * * *